United States Patent
True et al.

(10) Patent No.: US 8,284,674 B2
(45) Date of Patent: *Oct. 9, 2012

(54) AIRCRAFT DATA LINK NETWORK ROUTING

(75) Inventors: Willard R. True, Kirkland, WA (US); Alfonso Malaga, Sammamish, WA (US); Matt E. Larsen, Duvall, WA (US); Richard J. Eckert, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/790,382

(22) Filed: May 28, 2010

(65) Prior Publication Data

US 2010/0232295 A1 Sep. 16, 2010

Related U.S. Application Data

(63) Continuation of application No. 11/835,864, filed on Aug. 8, 2007, now Pat. No. 7,729,263.

(51) Int. Cl.
*H04L 12/56* (2006.01)

(52) U.S. Cl. ........................................ 370/238

(58) Field of Classification Search .................. 370/229, 370/235, 238, 230.1, 401; 455/403, 422.1, 455/431
See application file for complete search history.

(56) References Cited

U.S. PATENT DOCUMENTS

| | | | |
|---|---|---|---|
| 4,901,307 A | 2/1990 | Gilhousen et al. | |
| 5,095,480 A * | 3/1992 | Fenner | 370/238 |
| 5,530,909 A | 6/1996 | Simon et al. | |
| 5,710,764 A | 1/1998 | Yoshimura et al. | |
| 5,835,059 A | 11/1998 | Nadel et al. | |
| 6,047,165 A | 4/2000 | Wright et al. | |
| 6,104,712 A | 8/2000 | Robert et al. | |
| 6,108,539 A | 8/2000 | Ray et al. | |
| 6,147,980 A * | 11/2000 | Yee et al. | 370/316 |
| 6,148,179 A | 11/2000 | Wright | |
| 6,154,636 A | 11/2000 | Wright et al. | |
| 6,160,998 A | 12/2000 | Wright et al. | |
| 6,163,681 A | 12/2000 | Wright et al. | |

(Continued)

FOREIGN PATENT DOCUMENTS

EP 1850543 10/2007

(Continued)

OTHER PUBLICATIONS

"The ATN SARPs Third Edition", "Manual of Technical Provisions for the Aeronautical Telecommunications Network—ICAO DOC 9705/AN956", Publisher: ATN.

(Continued)

*Primary Examiner* — Chi Pham
*Assistant Examiner* — Robert Lopata
(74) *Attorney, Agent, or Firm* — Fogg & Powers LLC (57) ABSTRACT

A method includes selecting a first communications network from a plurality of communications networks based on one or more aircraft state inputs. The one or more aircraft state inputs include at least one of a flight phase, a flight event, an aircraft position, an aircraft trajectory, an aircraft state, and an aircraft distance from a ground station. The method further includes transmitting data over the first communication network. The method further includes selecting a second communications network from the plurality of communications networks based on a change in the one or more aircraft state inputs.

20 Claims, 5 Drawing Sheets

U.S. PATENT DOCUMENTS

| | | | |
|---|---|---|---|
| 6,173,230 B1 | 1/2001 | Camus et al. | |
| 6,181,990 B1 | 1/2001 | Grabowsky et al. | |
| 6,195,189 B1 | 2/2001 | Nishihata et al. | |
| 6,259,379 B1 | 7/2001 | Paterson et al. | |
| 6,262,659 B1 | 7/2001 | Korkosz et al. | |
| 6,285,878 B1 | 9/2001 | Lai | |
| 6,308,044 B1 | 10/2001 | Wright et al. | |
| 6,353,779 B1 | 3/2002 | Simon et al. | |
| 6,438,468 B1 | 8/2002 | Muxlow et al. | |
| 6,477,152 B1 | 11/2002 | Hiett | |
| 6,606,055 B2 | 8/2003 | Halsema et al. | |
| 6,643,274 B2 | 11/2003 | D'Annunzio | |
| 6,671,589 B2 | 12/2003 | Holst et al. | |
| 6,677,888 B2 | 1/2004 | Roy | |
| 6,744,396 B2 | 6/2004 | Stone et al. | |
| 6,778,825 B2 | 8/2004 | Parkman | |
| 6,781,513 B1 | 8/2004 | Korkosz et al. | |
| 6,788,935 B1 | 9/2004 | McKenna et al. | |
| 6,795,408 B1 | 9/2004 | Hiett | |
| 6,810,527 B1* | 10/2004 | Conrad et al. | 725/76 |
| 6,816,728 B2* | 11/2004 | Igloi et al. | 455/431 |
| 6,819,670 B1* | 11/2004 | Fenner | 370/392 |
| 6,915,189 B2 | 7/2005 | Igloi et al. | |
| 6,925,088 B1* | 8/2005 | Moreaux | 370/407 |
| 6,931,248 B2* | 8/2005 | Borel | 455/431 |
| 6,940,832 B2 | 9/2005 | Saadawi et al. | |
| 6,965,816 B2 | 11/2005 | Walker | |
| 6,970,444 B2 | 11/2005 | Chwieseni et al. | |
| 6,990,319 B2 | 1/2006 | Wright et al. | |
| 7,020,708 B2* | 3/2006 | Nelson et al. | 709/230 |
| 7,027,812 B2 | 4/2006 | Dastrup et al. | |
| 7,072,977 B1 | 7/2006 | Bernard et al. | |
| 7,085,562 B1 | 8/2006 | Holder et al. | |
| 7,116,266 B1 | 10/2006 | Vesel et al. | |
| 7,177,939 B2 | 2/2007 | Nelson et al. | |
| 7,181,160 B2 | 2/2007 | Barrett | |
| 7,187,927 B1* | 3/2007 | Mitchell | 455/431 |
| 7,343,157 B1* | 3/2008 | Mitchell | 455/431 |
| 7,454,203 B2* | 11/2008 | Levitan | 455/431 |
| 7,512,714 B2 | 3/2009 | Eckert | |
| 7,519,014 B2 | 4/2009 | Allen et al. | |
| 7,633,873 B1* | 12/2009 | Kohler et al. | 370/238 |
| 7,643,426 B1* | 1/2010 | Lee et al. | 370/238 |
| 7,729,263 B2* | 6/2010 | True et al. | 370/238 |
| 7,756,508 B1* | 7/2010 | Usher et al. | 455/411 |
| 7,769,028 B2* | 8/2010 | Boley et al. | 370/395.42 |
| 2002/0009993 A1 | 1/2002 | Dastrup et al. | |
| 2002/0168971 A1 | 11/2002 | Parkman | |
| 2002/0191573 A1 | 12/2002 | Whitehill et al. | |
| 2003/0003872 A1 | 1/2003 | Brinkley et al. | |
| 2003/0071743 A1* | 4/2003 | Seah et al. | 340/945 |
| 2003/0072252 A1* | 4/2003 | Gurney et al. | 370/206 |
| 2003/0158963 A1* | 8/2003 | Sturdy et al. | 709/238 |
| 2003/0231574 A1 | 12/2003 | Okuda et al. | |
| 2004/0008253 A1* | 1/2004 | Monroe | 348/143 |
| 2004/0028003 A1 | 2/2004 | Diener et al. | |
| 2004/0132495 A1* | 7/2004 | Horton et al. | 455/562.1 |
| 2004/0235469 A1 | 11/2004 | Krug | |
| 2005/0026609 A1 | 2/2005 | Brinkley et al. | |
| 2005/0053026 A1 | 3/2005 | Mullan et al. | |
| 2005/0054346 A1 | 3/2005 | Windham et al. | |
| 2005/0064895 A1 | 3/2005 | Oesterling et al. | |
| 2005/0090201 A1 | 4/2005 | Lengies et al. | |
| 2005/0108374 A1 | 5/2005 | Pierzga et al. | |
| 2005/0143013 A1 | 6/2005 | Jha | |
| 2005/0174950 A1 | 8/2005 | Ayyagari | |
| 2005/0197748 A1 | 9/2005 | Holst et al. | |
| 2005/0220055 A1 | 10/2005 | Nelson et al. | |
| 2005/0221814 A1 | 10/2005 | Fagan et al. | |
| 2005/0221818 A1 | 10/2005 | Johnson et al. | |
| 2005/0232185 A1 | 10/2005 | Hudson et al. | |
| 2005/0281270 A1* | 12/2005 | Kossi et al. | 370/395.5 |
| 2005/0286452 A1 | 12/2005 | Hardgrave et al. | |
| 2006/0023677 A1 | 2/2006 | Labrador et al. | |
| 2006/0031394 A1 | 2/2006 | Tazuma | |
| 2006/0080451 A1 | 4/2006 | Eckert | |
| 2006/0098608 A1 | 5/2006 | Joshi | |
| 2006/0176842 A1 | 8/2006 | Tamura | |
| 2006/0178141 A1 | 8/2006 | McGuffin et al. | |
| 2007/0042773 A1 | 2/2007 | Alcorn | |
| 2007/0042774 A1 | 2/2007 | Alcorn | |
| 2007/0072590 A1 | 3/2007 | Levitan | |
| 2007/0183435 A1 | 8/2007 | Kettering et al. | |
| 2007/0213009 A1* | 9/2007 | Higashida et al. | 455/62 |
| 2007/0286097 A1* | 12/2007 | Davies | 370/255 |
| 2007/0297416 A1* | 12/2007 | Boley et al. | 370/395.21 |
| 2008/0144617 A1* | 6/2008 | Molsberry et al. | 370/389 |
| 2008/0186897 A1* | 8/2008 | Rune et al. | 370/315 |
| 2008/0205283 A1 | 8/2008 | McGuffin et al. | |
| 2008/0240038 A1* | 10/2008 | Lynch et al. | 370/331 |
| 2008/0240062 A1* | 10/2008 | Lynch et al. | 370/338 |
| 2009/0005041 A1* | 1/2009 | Steinberg et al. | 455/435.2 |
| 2009/0040963 A1 | 2/2009 | McGuffin | |
| 2009/0058682 A1 | 3/2009 | True | |
| 2009/0077626 A1 | 3/2009 | Leclercq et al. | |
| 2010/0057899 A1* | 3/2010 | Henkel | 709/223 |
| 2010/0272012 A1* | 10/2010 | Knefelkamp et al. | 370/328 |

FOREIGN PATENT DOCUMENTS

| | | |
|---|---|---|
| EP | 1926234 | 5/2008 |
| WO | 02079918 | 10/2002 |
| WO | 03053013 | 6/2003 |
| WO | 2005069545 | 7/2005 |
| WO | 2007022353 | 2/2007 |
| WO | 2007043827 | 4/2007 |
| WO | 2007054410 | 5/2007 |
| WO | 2007059560 | 5/2007 |
| WO | 2008007861 | 1/2008 |

OTHER PUBLICATIONS

Avionica, "Securelink", , pp. 1-2, Publisher: Avionica.

Carlos Jodar et al, "Wi-Fi Gatelink Trial Frankfurt and Muich, Germany White Paper", Aug. 9, 2006, pp. 118, Publisher: Arinc Proprietary.

Eklund et al., "IEEE Standard 802.16: A Technical Overview of the Wirelessman Air Interface for Broadband Wireless Access", "IEEE Communications Magazine", Jun. 2002, pp. i-107, Publisher: IEEE.

Hardy et al., "Aircraft Network and File Server—Arinc 763", Oct. 16, 2002, pp. 1-12, Publisher: AEEC (Airlines Electronic Engineering Committee).

"Technical Overview for Mark III Communications Management Unit (CMU)," pp. 1-59, Publisher: Honeywell Aerospace Electronic Systems.

Hurlburt et al., "A Data Communications Concept for a SATS Scenario", "4TH Integrated CNS Technologies Conference and Workshop", Apr. 2004, pp. 1-20.

Cordeiro et al., "IEEE 802.22: An Introduction to the First Wireless Standard Based on Congitive Radios", "Journal of Communications", Apr. 2006, pp. 38-47, vol. 1, No. 1, Publisher: Academy Publisher.

Ivancic, "Modular, Cost-Effective, Extensible Avionics Architecture for Secure Mobile Communications", "2006 IEEE Aerospace Conference—Mar. 4-11, 2006 Big Sky, Montana", 2006, pp. 1-9, Publisher: IEEE.

Polajnar et al., "Simple and Efficient Protocols for Guaranteed Message Delivery in Wireless Ad-hoc Networks", "Wireless and Mobile Computing, Networking and Communications 2005", Aug. 22, 2005, pp. 93-100, vol. 3, Publisher: IEEE, Published in: Piscataway, NJ.

Sakhaee et al., "Aeronautical ad hoc Networks", "Wireless Communications and Networking Conference", Jan. 1, 2006, pp. 246-251, Publisher: IEEE, Published in: Piscataway, NJ.

Teledyne Technologies Inc., "Wireless Groundlink System (WGL)", "www.teledyne-controls.com/productsolution.wirelessgroundlink.groundlink.asp", 2007, pp. 12, Publisher: Teledyne Technologies Inc.

Teledyne Technologies Inc., "New Release", "www.teledyne-controls.com/newscenter/sco.asp", 2007, pp. 1-2, Publisher: Teledyne Technologies Inc.

Zhou et al., "GeoLANMAR: Geo Assisted Landmark Routing for Scalable, Group Motion Wireless Ad Hoc Networks", "Vehicular Technology Conference 2005", May 30, 2005, pp. 2420-2424, vol. 4, Publisher: IEEE, Published in: Piscataway, NJ.

\* cited by examiner

AIRCRAFT DATA LINK NETWORK ROUTING

CROSS-REFERENCE TO RELATED APPLICATIONS

The present application is a continuation of, and claims priority to, U.S. patent application Ser. No. 11/835,864 (hereafter "the '864 Application"), entitled "AIRCRAFT DATA LINK NETWORK ROUTING," filed on Aug. 8, 2007 now U.S. Pat. No. 7,729,263. The '864 Application is incorporated herein by reference in its entirety.

BACKGROUND

Flight phase measurements are already in common use in aircraft communication. A specific flight phase is often used to trigger certain communications messages. For example, many aircraft maintenance systems send their reports over an air-ground data link network when an aircraft is on final approach or immediately after touch-down. In addition, air-ground data links send information between an aircraft and air traffic control services when the aircraft is too far from an air traffic control tower to make voice radio communication and radar possible. For example, aircraft data link systems are used for long-distance flights operating over any substantial land and water routes.

Recurring costs of aircraft air-ground data link messages are significant. For example, message delivery rates (that is, upload and download speeds) vary considerably during certain flight phases between network service providers, the aircraft's location, and any applicable air-ground networks and sub-networks within the vicinity of the aircraft. Since connection rates for a specific air-ground network (sub-network) vary by service provider, any incremental improvement in network routing of the aircraft data links between various endpoints represents substantial cost benefits.

For the reasons stated above and for other reasons stated below which will become apparent to those skilled in the art upon reading and understanding the present specification, there is a need in the art for improvements in aircraft data link network routing.

SUMMARY

The following specification discusses aircraft data link network routing in an avionics communications system. This summary is made by way of example and not by way of limitation. It is merely provided to aid the reader in understanding some aspects of one or more embodiments described in the following specification.

In one embodiment a method is provided. The method includes selecting a first communications network from a plurality of communications networks based on one or more aircraft state inputs. The one or more aircraft state inputs include at least one of a flight phase, a flight event, an aircraft position, an aircraft trajectory, an aircraft state, and an aircraft distance from a ground station. The method further includes transmitting data over the first communication network. The method further includes selecting a second communications network from the plurality of communications networks based on a change in the one or more aircraft state inputs.

DRAWINGS

These and other features, aspects, and advantages are better understood with regard to the following description, appended claims, and accompanying drawings where:

The various described features are drawn to emphasize features relevant to the embodiments disclosed. Reference characters denote like elements throughout the figures and text of the specification.

DETAILED DESCRIPTION

Embodiments of the present invention describe aircraft data link network routing over various service provider networks through an aircraft communications management unit (CMU). In at least one embodiment, a plurality of wireless networks covering local, metropolitan and wide-area (collectively, of global or continental scales) are used based on an expanded set of programmable message routing rules to select the appropriate network(s) at any given time. The network routing discussed here provides appropriate data link services based on network availability and application needs to various aircraft data link applications. Moreover, message routing and network selections are based on current aircraft states and flight phases.

As discussed in further detail below, the message routing and network selection rules are separate from specific networking protocol interfaces. The programmable rules can be customized to meet individual customer requirements of (for example) commercial airlines or aircraft manufacturers, as further described below. In addition, the network routing discussed here provides an application framework that is independent of any present (or future) networking protocol architecture, including any bandwidth efficient (that is, non-spread spectrum) wireless communications networks, as further discussed below.

In one implementation, a message routing function block provides a uniform service interface to converging data link applications attempting to communicate over the plurality of wireless networks. Any specific data link application requests are analyzed and the message routing rules are defined based on network availability. A network selection and management function block monitors and selects the various wireless networks and sub-networks for the service interface of the message routing function block. The network selection and management function block analyzes various aircraft state inputs and applies the message routing and network selection rules. The network routing discussed here combines information about network availability, user preferences (as specified in the programmable message routing and network selection rules), and the various data link application requirements to select preferred communications networks for any aircraft data link message routing.

Examples of applicable aircraft data link processing applications suitable for use with the network routing discussed here include, but are not limited to, flight management system (FMS) database information, avionics display data downloads, aircraft engine data, electronic flight bag (EFB) data, Quick Access data, Flight Operations Quality Assurance (FOQA) data, in-flight entertainment data, Aeronautical Operational Control (AOC) data, Air Traffic Control (ATC) data, Aeronautical Telecommunications Network (ATN) data, and Aircraft Communications Addressing and Reporting System (ACARS) data.

Figure 1:
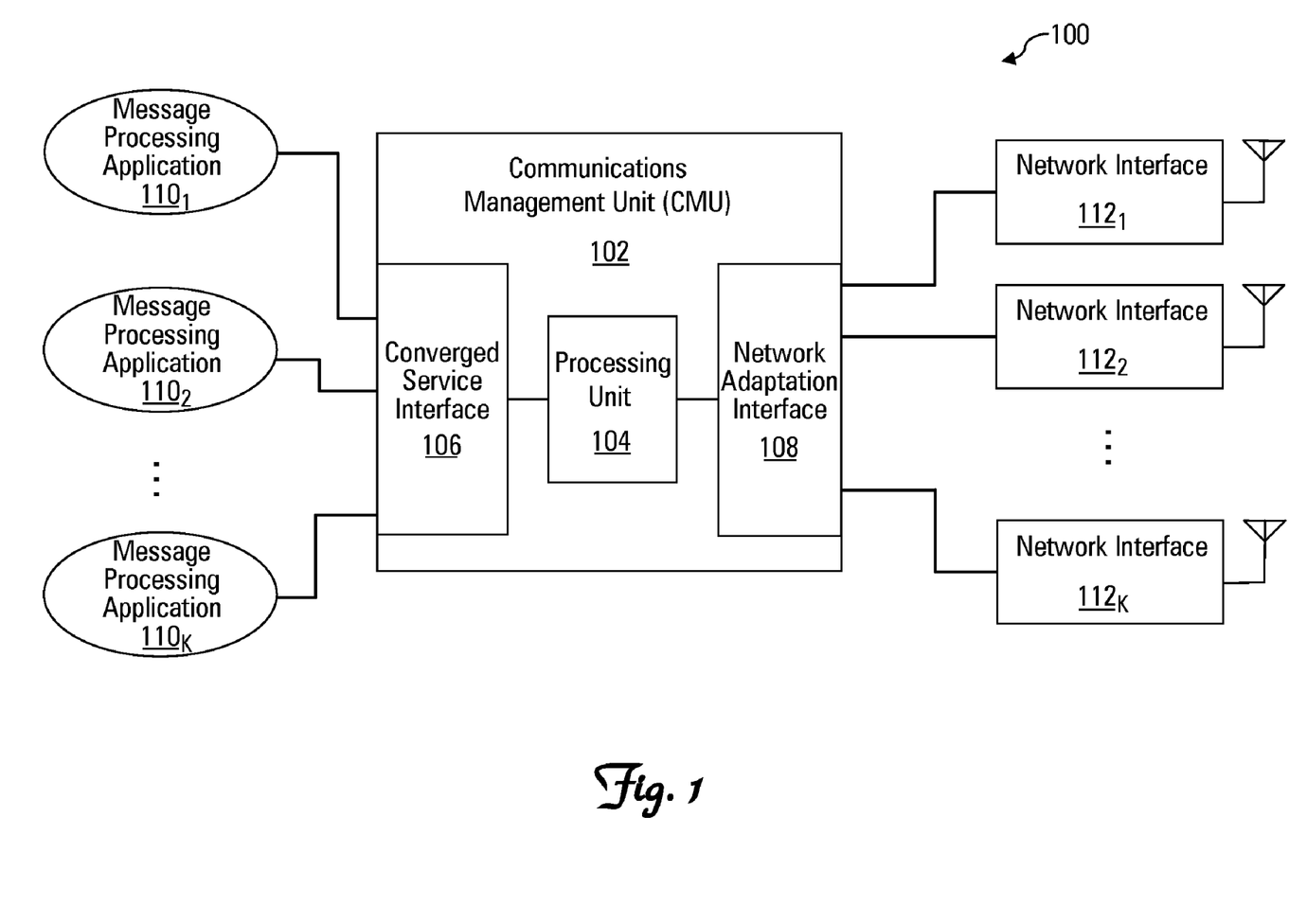
FIG. 1 is a block diagram of an avionics communications system.

FIG. 1 is a block diagram of an avionics communications system 100. The system 100 comprises a CMU 102 having a processing unit 104. In the example embodiment of FIG. 1, the processing unit 104 is at least one of a programmable microprocessor, a field-programmable gate array (FPGA), a field-programmable object array (FPOA), an application-specific integrated circuit (ASIC), and a programmable logic device (PLD). Communicatively coupled to the processing unit 104 within the CMU 102 are a converged service interface 106 and a network adaptation interface 108. The converged service interface 106 serves as an on-board routing function for data link messages to (from) the message processing applications 110. In one implementation, the converged service interface 106 transfers the data link messages between the appropriate message processing applications 110. Moreover, the converged service interface 106 translates between various data types of the message processing applications 110 for a plurality of routers (discussed below with respect to FIG. 2) to establish connectivity between the aircraft and any requested endpoints. The network adaptation interface 108 provides network-specific adaptation functions to transmit specific application information over certain communications networks as further discussed below with respect to FIG. 3.

The system 100 further comprises message processing applications $110_1$ to $110_K$ communicatively coupled to the CMU 102. It is understood that the system 100 is capable of accommodating any appropriate number of message processing applications 110 (for example, at least one message processing application 110) in a single system 100. As further discussed below with respect to FIG. 2, the message processing applications $110_1$ to $110_K$ include, but are not limited to, an FMS, aircraft traffic services, an aircraft condition monitoring system, an EFB, and similar combinations of CMU-hosted message processing applications thereof. In addition, the system 100 comprises a plurality of network interfaces $112_1$ to $112_K$ communicatively coupled to the CMU 102. It is understood that the system 100 is capable of accommodating any appropriate number of network interfaces 112 (for example, at least one network interface 112) in a single system 100. As further discussed below with respect to FIG. 2, each of the network interfaces $112_1$ to $112_K$ are responsive to at least one wireless communications network including, but not limited to, a very high frequency (VHF) data link, a high frequency (HF) data link, a satellite communications (SATCOM) data link, a local area network (LAN) such as a Wi-Fi network, a wide area network (WAN) such as a cellular radio network, a metropolitan area network (MAN) such as a Worldwide Interoperability for Microwave Access (WiMAX) network, and similar bandwidth efficient wireless communications networks employing, among others, Orthogonal Frequency Division Multiplexing (OFDM)-based 802.11g, 802.11n, 802.16d, 802.16e networking protocols.

In operation, the processing unit 104 assigns at least one data link message routing service for a first message processing application 110 based on prescribed criteria (for example, from at least one set of programmable message routing rules). As a first communications network becomes available, the processing unit 104 selects a first message route on at least one of the network interfaces 112 from the assigned routing service. In one implementation, the processing unit 104 detects the available wireless communications networks from the plurality of bandwidth efficient communications networks supported by the CMU 102 that satisfy the prescribed criteria. Moreover, the processing unit 104 dynamically allocates any required bandwidth for the converged service interface 106 to support any communication endpoint requirements independent of data format and transport media for the data link network routing discussed here.

As instructed by the processing unit 104, the at least one network interface 112 transfers data link messages for the first message processing application 110 on the first message route that satisfies the prescribed criteria. In one implementation, the processing unit 104 activates at least one network interface 112 to transfer each of the messages according to a set of programmable network selection rules. If network availability changes over a plurality of flight phases of the aircraft, the processing unit 104 reassigns the at least one data link message route to continue data link message transmissions to and from the aircraft based on the prescribed criteria for each of the message processing applications 110. In one implementation, the processing unit 104 reassigns the first message route to select at least a second preferred network from the plurality of networks responsive to the network interfaces 112.

Figure 2:
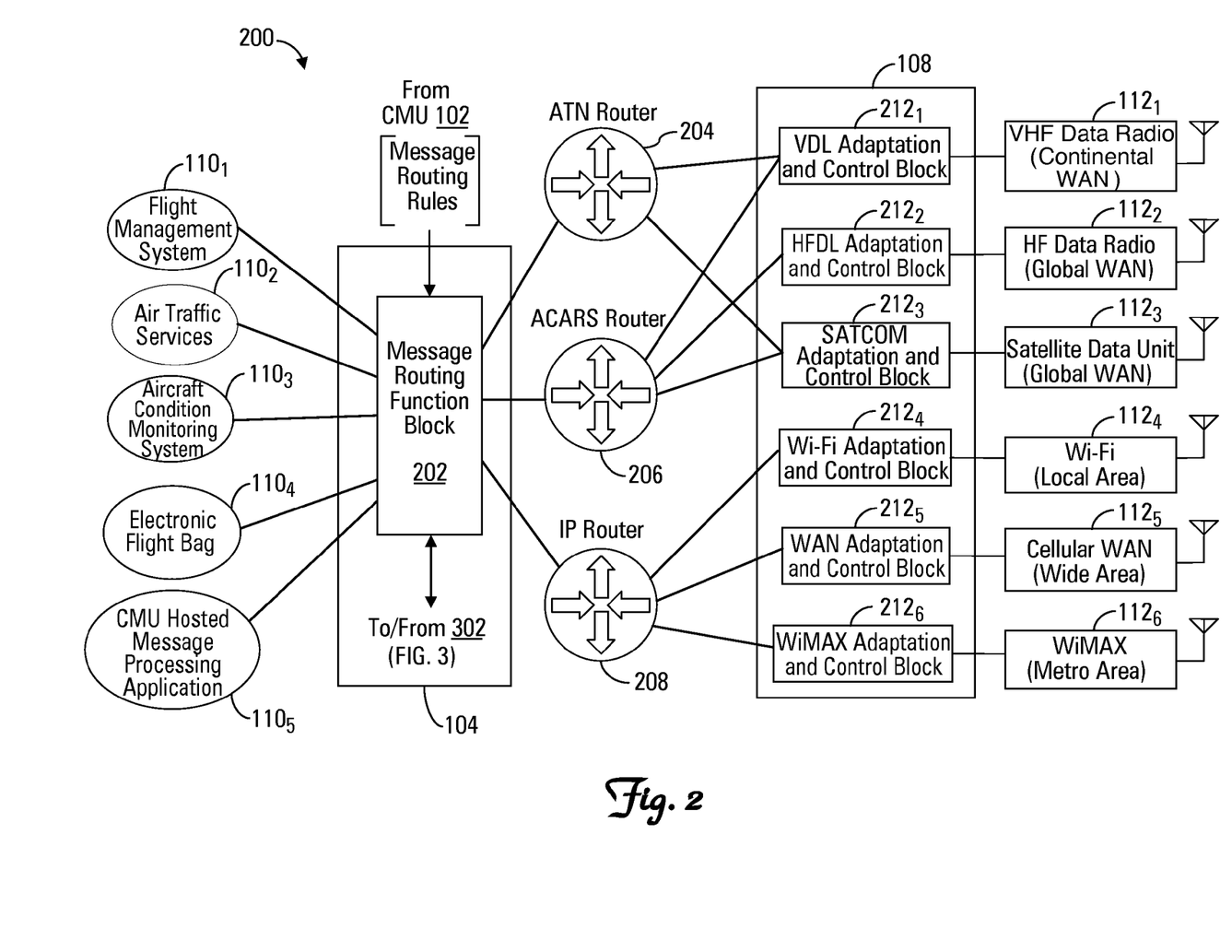
FIG. 2 is a block diagram of an embodiment of a message routing portion of an avionics communications system.

FIG. 2 is a block diagram of a message routing portion of an avionics communications system 200, similar to the system 100 of FIG. 1. The message routing portion of the system shown in FIG. 2 comprises the processing unit 104, the network adaptation interface 108, the message processing applications 110, and the network interfaces 112. The processing unit 104 further comprises a message routing function block 202 communicatively coupled to an ATN router 204, an ACARS router 206 and an Internet Protocol (IP) router 208. It is understood that additional routers for additional networking protocols are possible, and the network routing discussed here is not limited to any particular networking protocols. In at least one alternate implementation, the routers 204 to 208 form at least a portion of the processing unit 104.

In the example embodiment of FIG. 2, the message routing function block 202 is further responsive to the message processing applications $110_1$ to $110_5$. The message processing applications 110 comprise a flight management system $110_1$, aircraft traffic services $110_2$, an aircraft condition monitoring system $110_3$, an electronic flight bag (EFB) $110_4$, and a CMU-hosted message processing application $110_5$. As discussed above with respect to FIG. 1, alternate message processing applications 110 are possible. The message routing function block 202 is further operable to receive a plurality of programmable message routing rules from the CMU 102. As further discussed below with respect to FIG. 3, the message routing rules comprise network selection based on current aircraft equipment configurations, aircraft flight phase, current aircraft position and trajectory, message priority, network availability relative to other networks, relative cost of networks at a given point in time, and the like.

The routers 204 to 208 are further responsive to the network interfaces $112_1$ to $112_6$ through a plurality of adaptation and control blocks $212_1$ to $212_6$ of the network adaptation interface 108 as shown in FIG. 2. The network interfaces $112_1$ to $112_6$ comprise at least one of a VHF data link radio interface $112_1$, an HF data link radio interface $112_2$, a SATCOM data link radio interface $112_3$, a LAN interface $112_4$, a WAN interface $112_5$, and a MAN interface $112_6$. The adaptation and control blocks $212_1$ to $212_6$ include a VHF data link (VDL) radio adaptation and control block $212_1$, an HF data link (HDL) radio adaptation and control block $212_2$, a SATCOM data link radio adaptation and control block $212_3$, a LAN adaptation and control block $212_4$, a WAN adaptation and control block $212_5$, and a MAN adaptation and control block $212_6$.

In operation, the messaging routing rules from the CMU 102 are analyzed by the message routing function block 202. As data link messages from the message processing applications 110 are received in the message routing function block 202, the message routing function block 202 determines which of the routers 204 to 208 will transfer the message over the applicable network interface 112. In the example embodiment of FIG. 2, the message routing rules from the CMU 102 are evaluated by the message routing function block 202 and each of the data link messages pass through the network adaptation interface 108 for any additional network selection adaptation functions that may be required to complete the data link transmission, as further discussed below with respect to FIG. 3.

Figure 3:
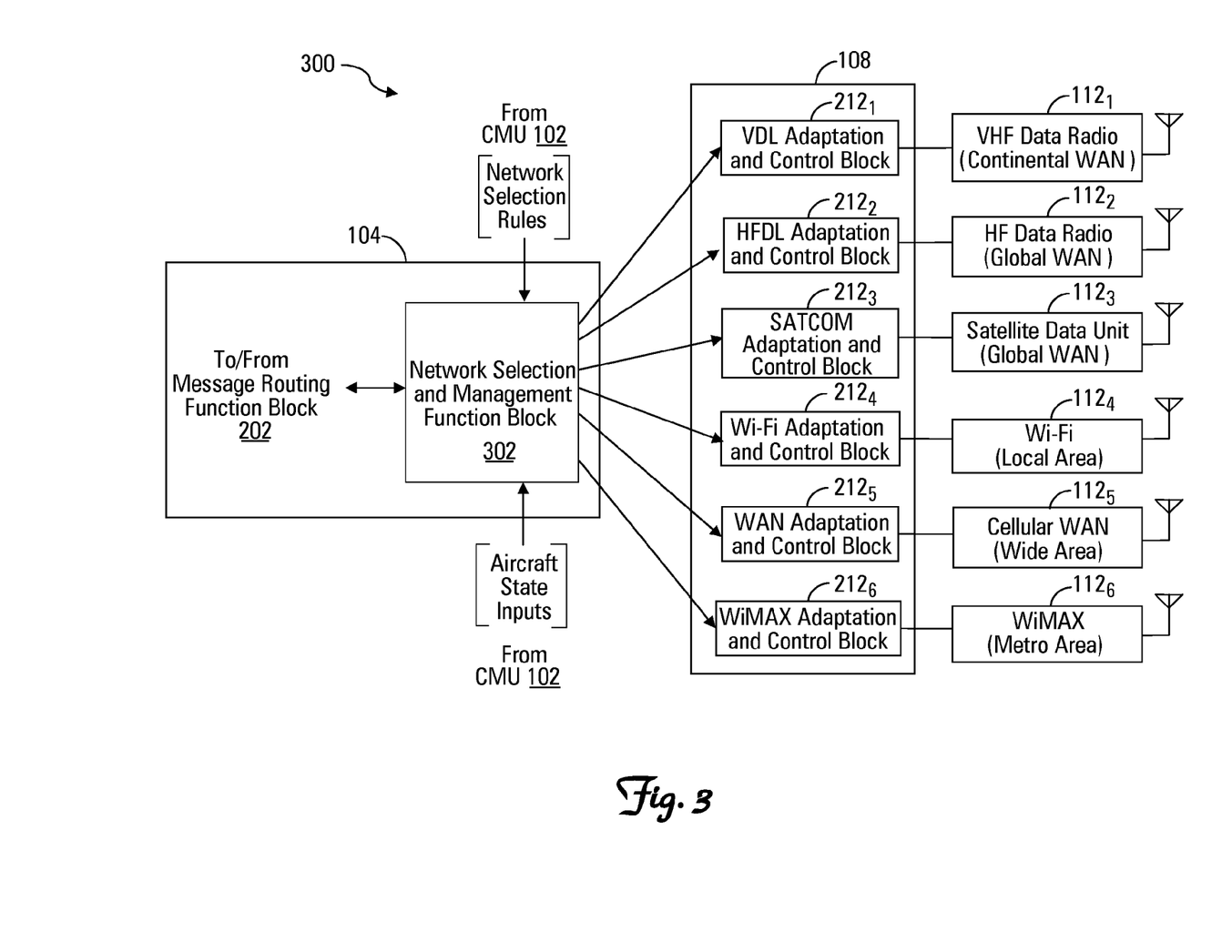
FIG. 3 is a block diagram of an embodiment of a network selection and management portion of an avionics communications system.

FIG. 3 is a block diagram of a network selection and management portion of an avionics communications system 300, similar to the system 100 of FIG. 1. The network selection and management portion of the system shown in FIG. 3 comprises the processing unit 104, the network interfaces 112, and the adaptation and control blocks $212_1$ to $212_6$ of the network adaptation interface 108. The processing unit 104 further comprises a network selection and management function block 302 responsive to the message routing function block 202 of FIG. 2. In the example embodiment of FIG. 3, the network selection and management function block 302 is operable to receive a plurality of aircraft state inputs based on a current flight phase of an aircraft hosting the system 100, as further described below with respect to FIG. 5. In one implementation, the plurality of aircraft state inputs comprise aircraft flight phase, aircraft location, network access level, message priority level, and the like.

In operation, each of the adaptation and control blocks 212 route aircraft data link messages through a preferred network interface 112 based on the programmable message routing and network selection rules managed by the network selection and management function block 302. The network selection and management function block 302 monitors and controls the network interfaces 112 based on message routing decisions provided by the message routing function block 202 and on the aircraft state inputs received from the CMU 102. As illustrated in Tables 1 to 3 below, the network selection and management function block 302 selects the appropriate network based on the aircraft state inputs and informs the appropriate adaptation and control blocks $212_1$ to $212_6$ to perform the necessary additional network selection adaptation functions to complete the data link transmission through the appropriate network interfaces $112_1$ to $112_6$. For example, the WiMAX adaptation and control block $212_6$ will format an ACARS message to be transmitted as an IP message by the WiMAX network interface $112_6$.

Aircraft State Inputs

A partial listing of aircraft state inputs from the CMU 102, including examples, appears below with respect to Table 1.

TABLE 1

| Aircraft State Inputs | |
|---|---|
| Aircraft State Inputs | Examples |
| Flight Phase | Pre-flight; Climb; Cruise; Descent; Takeoff; Approach; Go-Around and Done |

TABLE 1-continued

| Aircraft State Inputs | |
|---|---|
| Aircraft State Inputs | Examples |
| Flight Event | Out; Off; On and In (OOOI) |
| Aircraft Position and Trajectory | latitude; longitude; mapping coordinates |
| Aircraft State | Derived from on-board sensors, including but not limited to, strut switch/weight-on-wheels; parking brake; engine speed; engine oil pressure; air speed; ground speed; radio altimeter altitude; barometric altitude |
| Aircraft distance from specific ground stations | Distance to an ACARS VDL ground station; Distance to WiMAX or Wi-Fi access points |
| Application Network Type | ACARS High Availability; ATN ATC communications; IP High Availability |
| Network Access Level and Relative Cost | ACARS Low Cost; ACARS Low Latency; IP Low Cost |
| Message Priority Level | High, Urgent, Low |

As provided by Table 1 above, each of the aircraft state inputs are evaluated along with the network selection rules and the programmable message routing rules to route each of the data link messages to the proper network. The routing rules are evaluated dynamically as aircraft state inputs are updated by the CMU 102. It is understood that the aircraft state inputs presented here are not meant to be an exhaustive listing and that any aircraft state input that may affect aircraft data link message routing can be used. In one implementation, the flight phase and the flight event inputs are adapted from Aeronautical Radio, Incorporated (ARINC) and ATC standards.

Programmable Message Routing and Network Selection Rules

A partial listing of programmable message routing rules from the CMU 102, including examples, appears below with respect to Table 2.

TABLE 2

| Programmable Message Routing Rules | |
|---|---|
| Message Routing Rules | Examples |
| Application 1, type 1 messages can use any ACARS or IP sub-network | High priority AOC messages |
| Application 1, type 2 messages can only use ACARS VHF or IP | Moderate priority AOC messages |
| Application 1, type 3 are held until Wi-Fi network detected | Low priority AOC messages |
| Application 2, type 1 messages use ATN network, VHF sub-network only | ATN ATC messages |
| Application 2, type 2 messages use ACARS network, VHF or SATCOM sub-networks only | FANS messages |
| Application 3, all types of messages can use ACARS or IP networks and any sub-network | External user of converged network service(s) |
| Application 4, all types of messages can use ACARS network and any ACARS sub-network | External ACARS application(s) |
| Application 5, type 1 messages can use any IP sub-network | High priority EFB messages |
| Application 5, type 2 messages can use only low cost IP sub-networks | Low priority EFB messages |

As provided by Table 2 above, each of the programmable message routing rules are evaluated dynamically as aircraft state inputs are updated by the CMU 102. It is understood that the message routing rules presented here are not meant to be an exhaustive listing and that any programmable message routing rules can be used. For example, the programmable message routing rules illustrated in Table 2 apply to routing applications that implement AOC and Future Air Navigation System (FANS) messaging standards. In order to route the data link messages using programmable message routing rules described above in Table 2, the system 300 actively manages the network (protocol) stacks and sub-networks in the network selection and management function block 302. The network selection and management function block 302 uses the programmable network selection rules that are also executed dynamically as aircraft and network state changes. Examples of network selection rules are shown below with respect to Table 3.

TABLE 3

Programmable Network Selection Rules

| Network Selection Rules | Examples |
| --- | --- |
| Selection based on network types supported by aircraft | Activate ACARS VHF sub-networks always using existing network selection rules |
| Selection based on current aircraft state AND other network availability | Activate ACARS SATCOM sub-network in (OOOI state OFF) OR (when no other ACARS sub-network is available) |
| Selection based on aircraft flight phase | Activate Wi-Fi when OOOI state is IN |
| Selection based on aircraft flight phase AND other network availability | (Activate WiMAX when flight phase IS NOT Cruise) AND (Wi-Fi is not available) |
| Selection based on aircraft flight phase AND other network availability | (Activate Cellular WAN when OOOI state is IN) AND (Wi-Fi is not available) AND (WiMAX is not available) |
| Selection based on aircraft flight phase | Deactivate WiMAX during a Cruise flight phase |
| Selection based on aircraft flight phase AND selection based on current aircraft position and trajectory | (Activate WiMAX when flight phase is Descent) AND (within 15 miles of destination airport) |
| Selection based on current aircraft position and trajectory | Activate ATN in an airspace defined by latitude/longitude region |

It is understood that the network selection rules of Table 3 are not meant to be an exhaustive listing and that any programmable network selection rules can be used. The programmable network selection rules within the scope of user data link messages can be refined by the customer and loaded in the CMU 102 independent of software that implements the network protocols. In one implementation, each set of the programmable message routing and network selection rules form at least a portion of a customizable feature set of known aircraft communications management systems. The programmable message routing and network selection rule sets that pertain to specific air traffic services can also be loaded independently of the operational software in the CMU 102, but would be controlled by standard aircraft certification processes.

Figure 4:
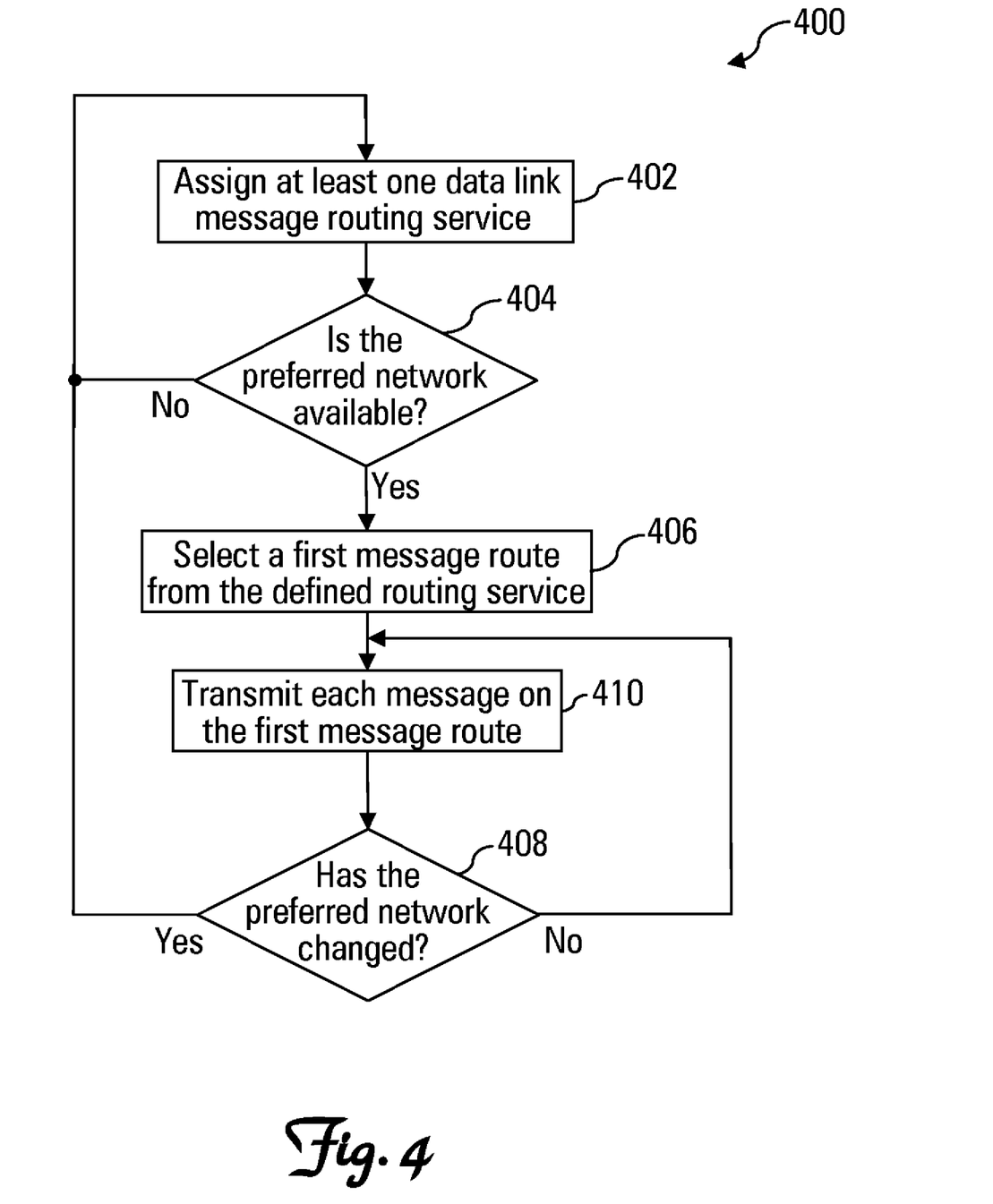
FIG. 4 is a flow diagram illustrating an embodiment of a method for aircraft data link network routing.

FIG. 4 is a flow diagram illustrating a method 400 for routing aircraft data link messages over a plurality of wireless communications networks. The method 400 addresses providing appropriate data link services based on network availability and application needs to the various on-board aircraft message routing applications discussed above with respect to FIGS. 1 to 3. The method 400 routes the appropriate data link services over the plurality of wireless communications networks, including the bandwidth efficient wireless networks discussed above with respect to FIGS. 1 to 3.

The method of FIG. 4 assigns at least one data link message routing service for an aircraft having a first message processing application based on prescribed criteria at block 402. In one implementation, the at least one data link message routing service receives instructions from a set of programmable message routing rules and a set of network selection rules (similar to the rules discussed above with respect to FIGS. 1 to 3) as the prescribed criteria. Moreover, the method of FIG. 4 incorporates each set of the message routing rules and the network selection rules as functions of a CMU of the aircraft.

If a first (that is, a preferred) communications network is available at block 404, the method 400 selects a first message route from the assigned routing service at block 406 for the preferred network based on at least one aircraft state input. The method 400 detects available networks from the plurality of bandwidth-efficient wireless communications networks that satisfy the prescribed criteria defined in block 402. In one implementation, the method 400 translates at least one data type of the first message processing application for at least one router to establish connectivity between the aircraft and any requested endpoints using the first message route. Moveover, the method 400 uses a converged service interface to dynamically allocate any required bandwidth for at least the first message route.

While the preferred network is available, the method 400 transmits each of the data link messages on the first message route that satisfies the prescribed criteria at block 410. When the prescribed criteria changes over a plurality of flight phases of the aircraft (block 408), the method 400 reassigns the at least one data link message route at block 402 to least one second preferred network selected from the plurality of bandwidth-efficient wireless communications networks. The reassigned data link message route continues data link message transmissions to and from the aircraft based on the latest prescribed criteria. For example, when the preferred network changes over the plurality of flight phases of the aircraft, one or more network application interfaces are activated (deactivated) as discussed below with respect to FIG. 5.

Figure 5:
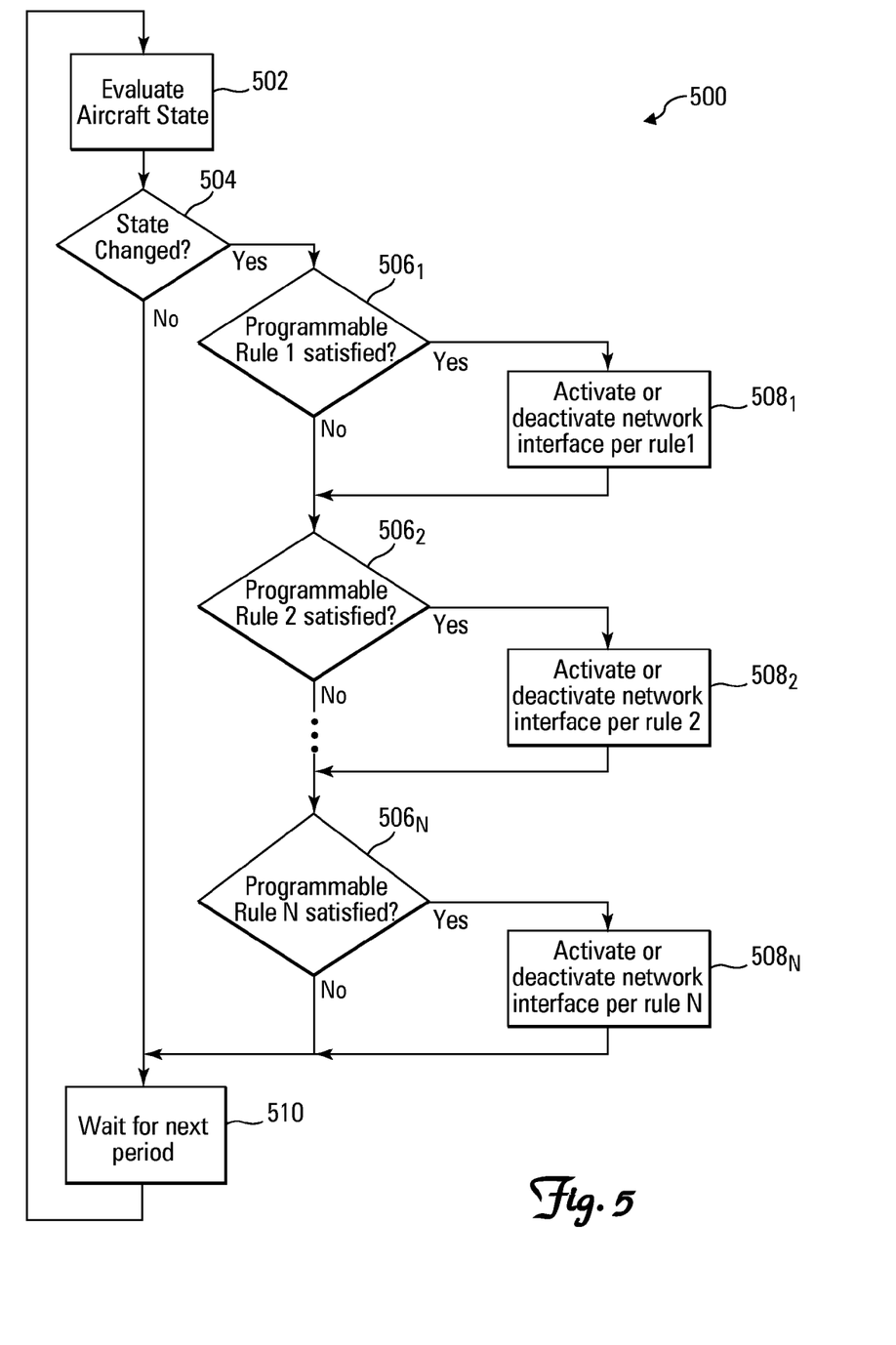
FIG. 5 is a flow diagram illustrating an embodiment of a method for network selection and management in an avionics communications system.

FIG. 5 is a flow diagram illustrating an embodiment of a method 500 for network selection and management in an avionics communications system. The method 500 manages the various network application interfaces discussed above with respect to FIG. 4 based on network availability and application service needs (for example, current aircraft states). The method of FIG. 5 periodically evaluates at least one aircraft state at block 502. If the at least one aircraft state has changed since a previous evaluation (block 504), each of the programmable network selection rules (for example, network selection rules 1 to N) are individually evaluated at blocks $506_1$ to $506_N$. Periodic monitoring of the programmable network selection rules ensures that the prescribed message routing criteria in a network selection and management function block (for example, the network selection and management function block 302) continue to be satisfied. In one implementation, a current network interface (for example, the network interfaces $112_1$ to $112_K$) is activated (deactivated) at blocks $508_1$ to $508_N$ based on the programmable rule under evaluation. The method of FIG. 5 resumes after a prescribed time period elapses at block 510.

The methods and techniques described herein may be implemented in a combination of digital electronic circuitry and software residing in a programmable processor (for example, a special-purpose processor, or a general-purpose processor in a computer). An apparatus embodying these techniques may include appropriate input and output devices, a programmable processor, and a storage medium tangibly embodying program instructions for execution by the programmable processor. A process embodying these techniques may be performed by a programmable processor executing a program of instructions that operates on input data and generates appropriate output data. The techniques may be implemented in one or more programs that are executable on a programmable system including at least one programmable processor coupled to receive data and instructions from (and to transmit data and instructions to) a data storage system, at least one input device, and at least one output device. Generally, a processor will receive instructions and data from at least one of a read only memory (ROM) and a random access memory (RAM).

Storage media suitable for tangibly embodying computer program instructions and data include all forms of non-volatile memory, and include by way of example, semiconductor memory devices; ROM and flash memory devices; magnetic disks such as internal hard disks and removable disks; magneto-optical disks; optical disks such as compact disks (CDs), digital video disks (DVDs), and other computer-readable media. Any of the foregoing may be supplemented by, or incorporated in, a specially-designed ASIC. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also included within the scope of computer-readable media.

This description has been presented for purposes of illustration, and is not intended to be exhaustive or limited to the embodiments disclosed. Variations and modifications may occur, which fall within the scope of the following claims.

What is claimed is:

1. A method comprising:
   determining one or more aircraft state inputs, wherein the one or more aircraft state inputs include at least one of a flight phase, a flight event, an aircraft position, an aircraft trajectory, an aircraft state, and an aircraft distance from a ground station;
   selecting a first communications network from a plurality of communications networks based on the determined one or more aircraft state inputs;
   transmitting data over the first communication network;
   determining a change has occurred in the one or more aircraft state inputs;
   selecting a second communications network from the plurality of communications networks based on the change in the one or more aircraft state inputs;
   wherein the second communications network is a different type of communication network than the first communications network.

2. The method of claim 1, wherein the flight phase includes at least one of pre-flight, climb, cruise, descent, takeoff, approach, go-around, and done.

3. The method of claim 1, wherein the flight event includes at least one of out, off, on, and in.

4. The method of claim 1, wherein the aircraft position includes at least one of latitude, longitude, and mapping coordinates.

5. The method of claim 1, wherein the aircraft state is derived from on-board sensors.

6. The method of claim 5, wherein the on-board sensors include at least one of a strut switch, a weight-on-wheels sensor, a parking brake sensor, an engine speed sensor, an engine oil pressure sensor, an air speed sensor, a ground speed sensor, a radio altimeter, and a barometric altimeter.

7. The method of claim 1, wherein the plurality of communications networks include at least one of a very high frequency (VHF) data link, a high frequency (HF) data link, a satellite communications (SATCOM) data link, a local area network (LAN), a Wi-Fi network, a wide area network (WAN), a cellular radio network, a metropolitan area network (MAN), and a Worldwide Interoperability for Microwave Access (WiMAX) network.

8. The method of claim 1, further comprising:
   switching from the first communications network to the second communications network based on a network selection rule applied to the one or more aircraft state inputs.

9. The method of claim 8, wherein the network selection rule is applied to a plurality of the one or more received aircraft state inputs.

10. A computer program product comprising program instructions, embodied on a non-transitory machine-readable storage medium, the program instructions cause at least one programmable processor in an aircraft communications management unit to:
    determine one or more aircraft state inputs, wherein the one or more aircraft state inputs include at least one of a flight phase, a flight event, an aircraft position, an aircraft trajectory, an aircraft state, and an aircraft distance from a ground station;
    select a first communications network from a plurality of communications networks based on the determined one or more aircraft state inputs;
    transmit data over the first communication network;
    determine a change has occurred in the one or more aircraft state inputs;
    select a second communications network from the plurality of communications networks based on the change in the one or more aircraft state inputs;
    wherein the second communications network is a different type of communication network than the first communications network.

11. The computer program product of claim 10, wherein the flight phase includes at least one of pre-flight, climb, cruise, descent, takeoff, approach, go-around, and done.

12. The computer program product of claim 10, wherein the flight event includes at least one of out, off, on, and in.

13. The computer program product of claim 10, wherein the aircraft position includes at least one of latitude, longitude, and mapping coordinates.

14. The computer program product of claim 10, wherein the aircraft state is derived from on-board sensors.

15. The computer program product of claim 14, wherein the on-board sensors include at least one of a strut switch, a weight-on-wheels sensor, a parking brake sensor, an engine speed sensor, an engine oil pressure sensor, an air speed sensor, a ground speed sensor, a radio altimeter, and a barometric altimeter.

16. The computer program product of claim 10, wherein the plurality of communication networks include at least one of a very high frequency (VHF) data link, a high frequency (HF) data link, a satellite communications (SATCOM) data link, a local area network (LAN), a Wi-Fi network, a wide area network (WAN), a cellular radio network, a metropolitan area network (MAN), and a Worldwide Interoperability for Microwave Access (WiMAX) network.

17. The computer program product of claim 10, wherein the program instructions further cause the at least one programmable processor to:

switch from the first communications network to the second communications network based on a network selection rule applied to the one or more aircraft state inputs.

18. An avionics communication system, comprising:

a communications management unit having a plurality of routers;

a plurality of message processing applications communicatively coupled to the communications management unit;

a plurality of network interfaces, communicatively coupled to the communications management unit, each of the network interfaces responsive to at least one wireless communications network; and a processing unit within the communications management unit and responsive to the plurality of message processing applications and the plurality of network interfaces, the processing unit configured to determine one or more aircraft state inputs and switch from a first network interface of the plurality of network interfaces to a second network interface of the plurality of network interfaces in response to a change in the one or more aircraft state inputs, wherein the one or more aircraft state inputs includes at least one of a flight phase, a flight event, an aircraft position, an aircraft trajectory, an aircraft state, and an aircraft distance from a ground station, and wherein the second network interface communicates with a different type of wireless communication network than the first network interface.

19. The system of claim 18, wherein the flight phase includes at least one of pre-flight, climb, cruise, descent, takeoff, approach, go-around, and done.

20. The system of claim 18, wherein the flight event includes at least one of out, off, on, and in.

* * * * *